Oct. 27, 1925.

E. E. GOLD

HEATING SYSTEM

Filed Oct. 10, 1922

1,559,042

Inventor
Edward E. Gold
By Attorney
Fraser, Junk & Myers.

Patented Oct. 27, 1925.

1,559,042

UNITED STATES PATENT OFFICE.

EDWARD E. GOLD, OF NEW YORK, N. Y., ASSIGNOR TO GOLD CAR HEATING & LIGHTING COMPANY, OF BROOKLYN, NEW YORK, A CORPORATION OF NEW YORK.

HEATING SYSTEM.

Application filed October 10, 1922. Serial No. 593,580.

*To all whom it may concern:*

Be it known that I, EDWARD E. GOLD, a citizen of the United States of America, residing in the borough of Manhattan, city, county, and State of New York, have invented certain new and useful Improvements in Heating Systems, of which the following is a specification.

This invention relates to improvements in thermostatically controlled heating systems and is well adapted for use in the heating of railway cars, although it is equally applicable for heating of rooms or chambers in other structures. It is an object of the invention to provide thermostatic regulating means for a heat radiator in which the thermostat or thermostats and the valve controlled thereby may be located at the most effective points considered from the standpoint of convenience and economy irrespective of their relative positions and irrespective of the distance by which they may be separated each from the other.

The improvement of the present invention is applicable to radiators operating in accordance with the well known vapor system in which the steam in the radiator is maintained substantially at atmospheric pressure or to radiators in which the steam is maintained at a predetermined pressure materially above that of the atmosphere. The improvements are also applicable to systems in which the regulation may be readily converted so as to be operative either at vapor pressure or at a pressure materially above atmospheric at will.

The invention also comprises thermostatic means whereby the radiator admission valve may be alternately opened and closed as the pressure in the radiator respectively falls below or exceeds a predetermined pressure above that of the atmosphere which it is desired to have maintained therein, and this pressure may be maintained at a point materially below that in the feed pipe from which the radiator is supplied.

The invention also comprises an improved thermostat in which the thermomotive element and the electric switch to be operated thereby are all enclosed so as to be shielded from the direct action of the steam or other heating fluid with which the radiator is supplied and these parts are all readily detachable from the radiator and from each other to facilitate the renewal of surrounding parts and repairs.

Referring to the drawings illustrating the preferred form of the invention:

Figure 1:
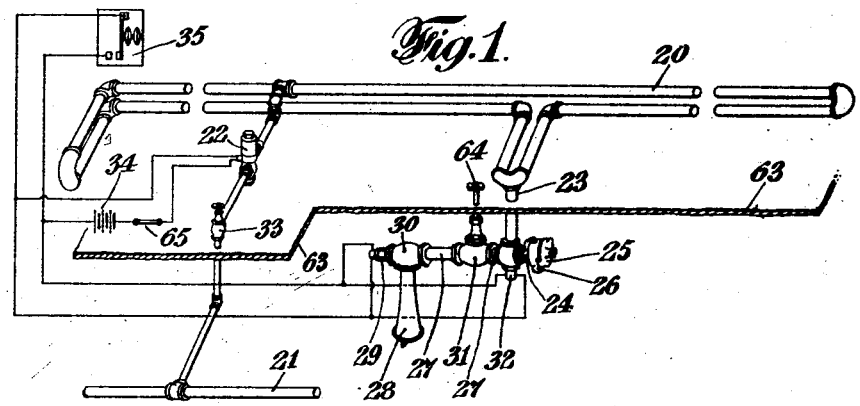
Figure 1 is a conventional or diagrammatic view in perspective of a radiator with the improved thermostatic controlling device attached.

Fig. 1 illustrates conventionally the invention as applied to the steam heating system of a railway car, although certain features of the invention would be equally applicable to hot water heating systems and to systems for use in permanent buildings and other structures. In the diagram referred to 20 designates a radiator which may be supplied with steam from a train pipe 21, the admission being controlled by an electrically operated valve 22.

The piping of the radiator is preferably inclined so as to carry the water of condensation to an outlet 23 which may if desired be branched, one branch 24 being provided with a trap 25 to discharge water of condensation through a drip pipe 26 and the other branch 27 leading to a ventilating and drip horn 28.

A thermostat 29, hereinafter described, may be located in the pipe fitting 30 by which the drip horn is connected to the outlet branch 27 and the valve 31 may be included in the branch 27 between the radiator and the thermostat. A second thermostat 32 may if desired be placed in the fitting which connects the outlet 23 with the branch outlets 24 and 27.

Preferably a manually operative valve 33 may be included in the connection between the train pipe and the electrically operated valve 22 whereby the radiator may be permanently cut off from the train pipe when desired.

The thermostats 29 and 32 may be connected in multiple with each other and each with the electrically operated valve 22 and a source of electric energy 34, as indicated, and a thermostat 35 sensitive to the temperature in the car or other chamber to be heated may also be connected in multiple with the thermostats 29 and 32, as indicated.

The electrically operated valve 22 may be either of the electromagnetic type, one form of which is disclosed in applicant's prior Patent No. 1,167,815, dated January 11, 1916, or of the thermo-electric type, an example of which is disclosed in applicant's prior Patent No. 1,337,764, dated April 20, 1920. This valve need not be specifically described as it constitutes of itself no part of the invention herein claimed. It is sufficient to say that in the form herein illustrated the valve is normally open for the admission of steam except when the electric circuit is closed by a thermostat at which time the valve is caused to be closed.

The thermostat 35 may be of any appropriate type adapted to close the electric circuit in which it is included when the surrounding air exceeds a predetermined temperature. Under normal conditions this thermostat may be designed so as to alternately open and close its circuit as the temperature of the room falls below or exceeds 70°. If desired, however, any other temperature may be selected as the critical temperature and an adjustable thermostat may be employed so that the critical temperature may be varied at will.

The thermostat 29 may be of any appropriate type adapted to be actuated so as to close a switch whenever steam at atmospheric pressure passes from the branch outlet 27 to the drip horn 28. It should, therefore, be sensitive to the temperature of steam at atmospheric pressure. Any suitable switch may be employed as a part of the thermostate but the switch should preferably be of the snap action type in order that the circuit can be quickly opened or closed at each operation of the thermostat.

Figure 2:
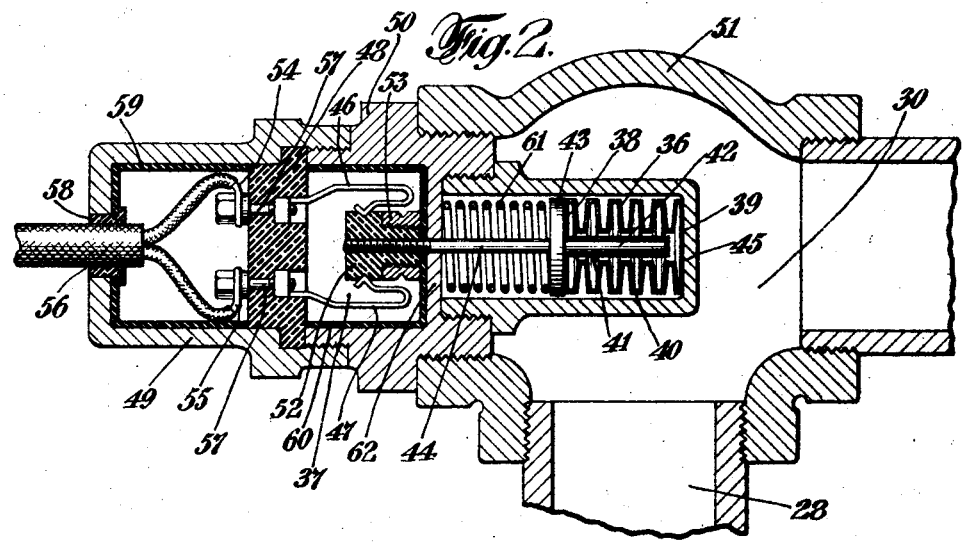
Fig. 2 is a vertical longitudinal section through a pipe fitting connected with the radiator and the thermostat connected thereto. This view shows the thermostat collapsed and the electric switch open.

One form of the thermostat is illustrated in Fig. 2 and comprises a sylphon or other appropriate form of a thermomotor 36 operatively connected with an electric switch designated generally 37.

Figure 3:
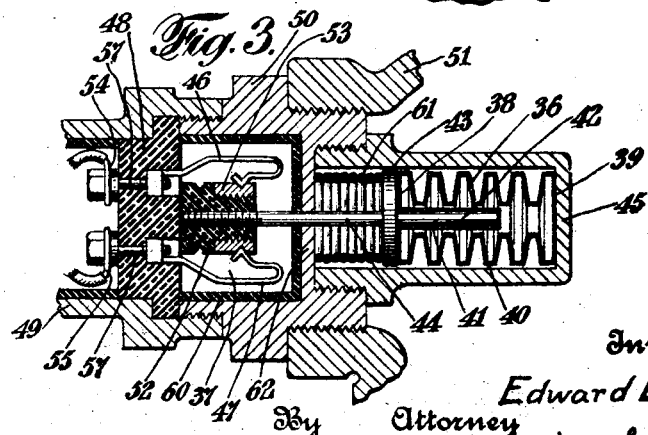
Fig. 3 is a section through a part of the same fitting and the connected thermostat showing the thermostat expanded and the switch closed.

The thermomotor 36 in the form herein disclosed comprises an expansible vessel having heads 38, 39 connected by a deeply corrugated outer wall 40, the head 38 being recessed as at 41 to receive a cylindrical projection 42 projecting from the center of a piston 43 connected by a piston rod 44 with the movable element of the switch 37. This thermomotor will be normally collapsed, as indicated in Fig. 2, but will have hermetically sealed therein a sufficient quantity of alcohol, ethyl-chlorid, or other volatile fluid to cause the vessel to be expanded, as indicated in Fig. 3, at the temperature to which the contents of said vessel will be raised when steam at atmospheric pressure is brought in contact with the housing 45 in which the thermomotor is contained.

The electric switch 37 may comprise resilient contacting members 46, 47 mounted in a block of suitable insulating material 48 which may be clamped between a cap 49 and a switch housing 50 in threaded connection with the fitting 51 to which the thermostat is connected. The movable element of the switch may comprise an insulator 52 threaded on the end of the piston rod 44 and carrying a contact ring 53 which may be threaded to said insulator.

Conductors 54, 55 may be passed through an opening 56 and connected respectively with the contacts 46, 47 by means of binding posts or other suitable fastening devices 57 by which the contact elements may also be secured to the insulating block 48. Preferably the cap 49 and switch housing 50 will be lined with suitable insulating material, as indicated at 58, 59, 60.

The housing 45 may have a threaded connection with the switch housing 50 and will preferably be cylindrical in form conforming in internal diameter with the diameter of the piston 43 so as to constitute a guide therefor and a spring 61 enclosed within said housing 45 between the piston 43 and the wall 62 of the switch housing normally tends to return and maintain the switch in the position indicated in Fig. 2 when the thermomotor is collapsed.

The depth of the grooves in the insulator 52 and contact ring 53, and the stiffness of the contact elements 46, 47 will be so proportioned that the switch will not respond immediately to increase of pressure in the thermomotor but will offer sufficient resistance to permit the pressure to accumulate so that when a movement of the switch is once initiated it will be quickly completed. In like manner after the switch has been moved to the position indicated in Fig. 3 it will not immediately return upon decrease of pressure in the thermomotor but will sufficiently oppose the force exerted by the spring 61 to slightly retard its action so that when the return movement is once initiated it will be quickly completed.

The thermostat 32 differs from thermostat 29 heretofore described only in that it is sensitive for reasons hereinafter explained to steam at a somewhat higher temperature than that of steam at atmospheric pressure. The thermostat 29, as heretofore explained, closes its switch when subjected to the temperature of steam at atmospheric pressure. The thermostat 32 on the contrary will be so designed as to respond and cause its switch to be closed at a temperature corresponding to the temperature of steam at any desired pressure above that of the atmosphere which it is desired to maintain in the radiator, as for example ten pounds. For this reason the thermostat 32 may be designated herein a "high temperature" thermostat as distinguished from the thermostat 29.

The trap 25 may be of any suitable type adapted to discharge water of condensation under the steam pressure which it is desired to maintain in the radiator. A suitable trap for this purpose is disclosed in applicant's prior Patent No. 507,268, dated October 24, 1893. It is unnecessary to describe this trap here other than to state that it comprises a thermostatically operated valve which is caused to open as a result of the lowering of the temperature when water of condensation accumulates at the end of the pipe to which the trap is connected. As soon as the condensed water is discharged the temperature of the steam causes the thermostat to close the valve. In this manner the radiator is kept free from water of condensation but the escape of steam is prevented.

When the device is applied to a railway car any desired parts may be placed below the floor, indicated diagrammatically at 63. In the present instance the train pipe, trap, valve 31, fitting 30, drip horn 28 and immediate connected parts are placed below the floor, the spindle of the valve 31 being extended up through the floor and terminating in a hand wheel 64 for operation within the car. The valves 22 and 33 are herein disclosed as being placed above the floor but these might also, if desired, be placed underneath the car.

It will now be apparent that the above described apparatus is adapted for operation either at vapor pressure, that is at the pressure of the atmosphere, or at a pressure materially above that of the atmosphere, the device being readily convertible from one type to the other.

Assuming the valve 31 to be open the device will operate at atmospheric pressure in the following manner: On opening the valve 33 steam will be admitted to the radiator through the normally open valve 22. When the radiator is filled with steam it will seek an outlet by means of the pipe 23, branch 27, fitting 30 and drip horn 28 thereby being brought into contact with the housing of the thermostat 29. As this thermostat is sensitive to steam at atmospheric pressure it will immediately cause the switch 37 to be closed thereby causing the valve 22 to close and prevent further admission of steam. As the temperature at the outlet of the radiator decreases as a result of the condensation of steam the thermostat will cause the switch 37 to be opened thereby permitting the valve 22 to open and admit more steam to the radiator. This process is continuous so long as it is desired to operate the radiator under steam at atmospheric pressure.

If it is desired to operate the radiator under steam at a pressure above that of the atmosphere the valve 31 will be closed after which the water of condensation will be discharged from the radiator by means of the trap 25. By closing the valve 31 the thermostat 29 will be isolated and will have no further effect upon the operation of the device.

If it is desired to supply the radiator with steam at a pressure above that of the atmosphere but lower than the pressure of steam in the train pipe, the thermostat 32 may be used in combination with the valve 22 as a pressure reducing means between the train pipe and the radiator. Under such circumstances when the steam in the radiator attains the pressure corresponding to the temperature to which the thermostat 32 is sensitive it will close its switch and cause the valve 22 to prevent further admission of steam. When the pressure in the radiator falls below that corresponding to the critical temperature at which the thermostat 32 responds, the switch will be opened and more steam will be supplied by the valve 22.

The thermostat 35 may be used in combination with other parts of the above described apparatus whether operated at atmospheric pressure or at a greater pressure. In either instance the thermostat 35 will be caused to close its switch when the temperature of the air in the heated chamber is caused to exceed the critical temperature of the thermostat. This will cause the valve 22 to be closed and no further steam will be admitted to the radiator irrespective of the condition of the other parts of the device until the temperature of the air in the chamber again falls below the critical temperature of the thermostat 35.

If desired the electrical connection between the source of energy 34 and the valve 22 may include an electric switch 65, which may be opened when the device is not in use.

What I claim is:

1. The combination with a steam radiator having an electrically operated steam admission valve, and a trapped outlet effective at a predetermined pressure to discharge water of condensation without permitting the escape of steam, of a second outlet connection normally open to atmosphere, a thermostat in said connection, said thermostat being sensitive to the temperature of steam at atmospheric pressure, an electric circuit connecting said thermostat and said valve with a source of energy, whereby the opening and closing of said valve may be controlled by said thermostat, and a valve in said connection between said thermostat and said radiator whereby on closing said last mentioned valve the thermostat will be rendered ineffective and steam may be maintained in said radiator at a pressure above that of atmosphere.

2. The combination defined by claim 1, further characterized in that the radiator has a branched outlet connection, one branch of said connection leading to the trapped outlet and the other to the outlet normally open to atmosphere.

3. The combination defined by claim 1 having a high temperature thermostat connected with said radiator at any point between the inlet valve and the trap, said high temperature thermostat being sensitive to the temperature of steam at the pressure to be maintained in said radiator when the valved outlet is closed, said thermostat being electrically connected with said steam admission valve whereby said admission valve will be alternately opened when the pressure falls below normal and closed when the pressure is restored.

4. The combination, with a steam radiator having an electrically operated admission valve, an outlet, and a trap in said outlet, of a thermostat connected with said radiator at a point between said valve and said trap, said thermostat being sensitive to the temperature of steam at a predetermined pressure at which the trap is operative to free the radiator of water of condensation, and an electric circuit connecting said thermostat and said valve with a source of energy whereby said valve may be alternately opened and closed as the pressure in said radiator falls below or exceeds said predetermined pressure.

5. The combination, with a steam radiator having an electrically operated admission valve, an outlet, and a trap in said outlet, of a thermostat connected with said outlet at a point between said radiator and said trap, said thermostat being sensitive to the temperature of steam at a predetermined pressure at which the trap is operative to free the radiator of water of condensation, and an electric circuit connecting said thermostat and said valve with a source of energy whereby said valve may be alternately opened and closed as the pressure in said radiator falls below or exceeds said predetermined pressure.

In witness whereof, I have hereunto signed my name.

EDWARD E. GOLD.